United States Patent [19]

Carnevale et al.

[11] Patent Number: 5,721,874
[45] Date of Patent: Feb. 24, 1998

[54] CONFIGURABLE CACHE WITH VARIABLE, DYNAMICALLY ADDRESSABLE LINE SIZES

[75] Inventors: Michael Joseph Carnevale; Gary Scott Delp, both of Rochester, Minn.

[73] Assignee: International Business Machines Corporation, Armonk, N.Y.

[21] Appl. No.: 491,375

[22] Filed: Jun. 16, 1995

[51] Int. Cl.⁶ .................................................. G06F 13/00
[52] U.S. Cl. .................. 395/497.02; 395/445; 395/446; 395/456; 395/497.04; 364/DIG. 3
[58] Field of Search ........................... 395/445, 446, 395/456, 497.02, 497.04

[56] References Cited

U.S. PATENT DOCUMENTS

| | | | |
|---|---|---|---|
| 4,228,503 | 10/1980 | Waite et al. | 395/448 |
| 4,315,312 | 2/1982 | Schmidt | 395/497.03 |
| 4,627,052 | 12/1986 | Hoare et al. | 370/85.13 |
| 4,809,265 | 2/1989 | Hart et al. | 371/48 |
| 4,905,141 | 2/1990 | Brenza | 395/456 |
| 4,947,319 | 8/1990 | Bozman | 395/497.03 |
| 5,014,195 | 5/1991 | Farrell et al. | 395/497.03 |
| 5,056,002 | 10/1991 | Watanabe | 395/446 |
| 5,161,219 | 11/1992 | Nicholson et al. | 395/446 |
| 5,226,141 | 7/1993 | Esbensen | 395/497.02 |
| 5,257,360 | 10/1993 | Schnizlein et al. | 395/445 |
| 5,276,832 | 1/1994 | Holman, Jr. | 395/497.03 |
| 5,339,313 | 8/1994 | Ben-Michael et al. | 370/85.13 |
| 5,586,303 | 12/1996 | Willenz et al. | 395/445 |

FOREIGN PATENT DOCUMENTS

| | | |
|---|---|---|
| 5-37528 | 2/1993 | Japan. |
| WO9219058 | 10/1992 | WIPO. |

OTHER PUBLICATIONS

IBM Technical Disclosure Bulletin, vol. 31, No. 4, Sep. 1988 "Cache Memory Management With Translation Lookaside Buffer".

IBM Technical Disclosure Bulletin, vol. 37, No. 7, Jul. 1994, "Buffer Pools: Sharing a Common Resource with Guarantees".

Patterson et al., Computer Organization & Design the Hardware/Software Interface, Chapter 7, pp. 454–481, 1994.

*Primary Examiner*—Frank J. Asta
*Attorney, Agent, or Firm*—Joan Pennington

[57] ABSTRACT

A configurable variable cache includes a cache memory for storing data. The cache memory is selectively configured into a variable number of variable size lines. At least one user is connected to the cache memory. An addressing function coupled to the cache memory is used for accessing the lines of the cache.

12 Claims, 8 Drawing Sheets

CONFIGURABLE CACHE WITH VARIABLE, DYNAMICALLY ADDRESSABLE LINE SIZES

FIELD OF THE INVENTION

The present invention relates to a cache, and more particularly to a configurable cache with variable, dynamically addressable line sizes.

DESCRIPTION OF THE PRIOR ART

A cache is a fast random access memory (RAM) device used as a buffer to temporarily store data which are currently in use. Often a cache is shared by many different kinds of devices or users. One cache example is a processor cache. A processor cache is a small, fast buffer that temporarily holds data and/or instructions for quick access by a processor.

Another cache example is the buffer memory included an input/output (I/O) bridge chip. An I/O bridge chip provides the connection between two different data buses in a computer system. Also an I/O bridge chip can be part of an input/output processor (IOP). An I/O bridge chip typically contains a cache, some registers, and the components necessary to connect two different buses together. Data flows to and from devices connected to one of the buses, through the bridge chip and its cache and to and from another bus, which might be connected to a different device or host computer. An example of such a configuration is a host computer with a host bus connected to a bridge chip, which is further connected to another bus that attaches multiple I/O processors.

An I/O bridge chip that bridges many different kinds of devices to and from a primary bus can encounter performance problems depending on the nature of the devices attached to it. Devices that burst data in a contiguous fashion benefit if the bridge chip has a relatively large cache buffer or line to hold the data until the buffer or line is filled. A cache line is a portion of cache memory that has a set of address tags associated with it. The data would then be routed by the bridge to the appropriate destination, either to or from the I/O device. This scheme does not work very well for other I/O devices that have several operations executing in an interleaved fashion that are not contiguous with each other.

For example, every data byte that is transferred to and from such a device may come from a different line in memory relative to the previous access. When the user only wants one byte, the whole line is brought into the cache. When a next user wants a different byte, a whole new line is brought in which may overwrite the first user's data. This causes performance degradation for two reasons. First, an entire cache line is transferred for a single byte read taking more time on the bus than required for a single byte read. Second, when the first user asks for a second byte that might have been in the line that was previously in the cache which was overwritten by the second user, requiring that the line be retrieved again. This lessens the usefulness of the cache. Similar performance problems can be encountered in a processor cache.

SUMMARY OF THE INVENTION

A principal object of the present invention is to provide a configurable cache with variable, dynamically addressable line sizes. Other objects of the present invention are to provide an improved cache configuration and to provide a configurable cache that overcomes many of the disadvantages of prior art arrangements.

In brief, a configurable variable cache includes a cache memory for storing data. The cache memory is selectively configured into a variable number of variable size lines. At least one user is connected to the cache memory. An addressing function coupled to the cache memory is used for accessing the lines of the cache.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
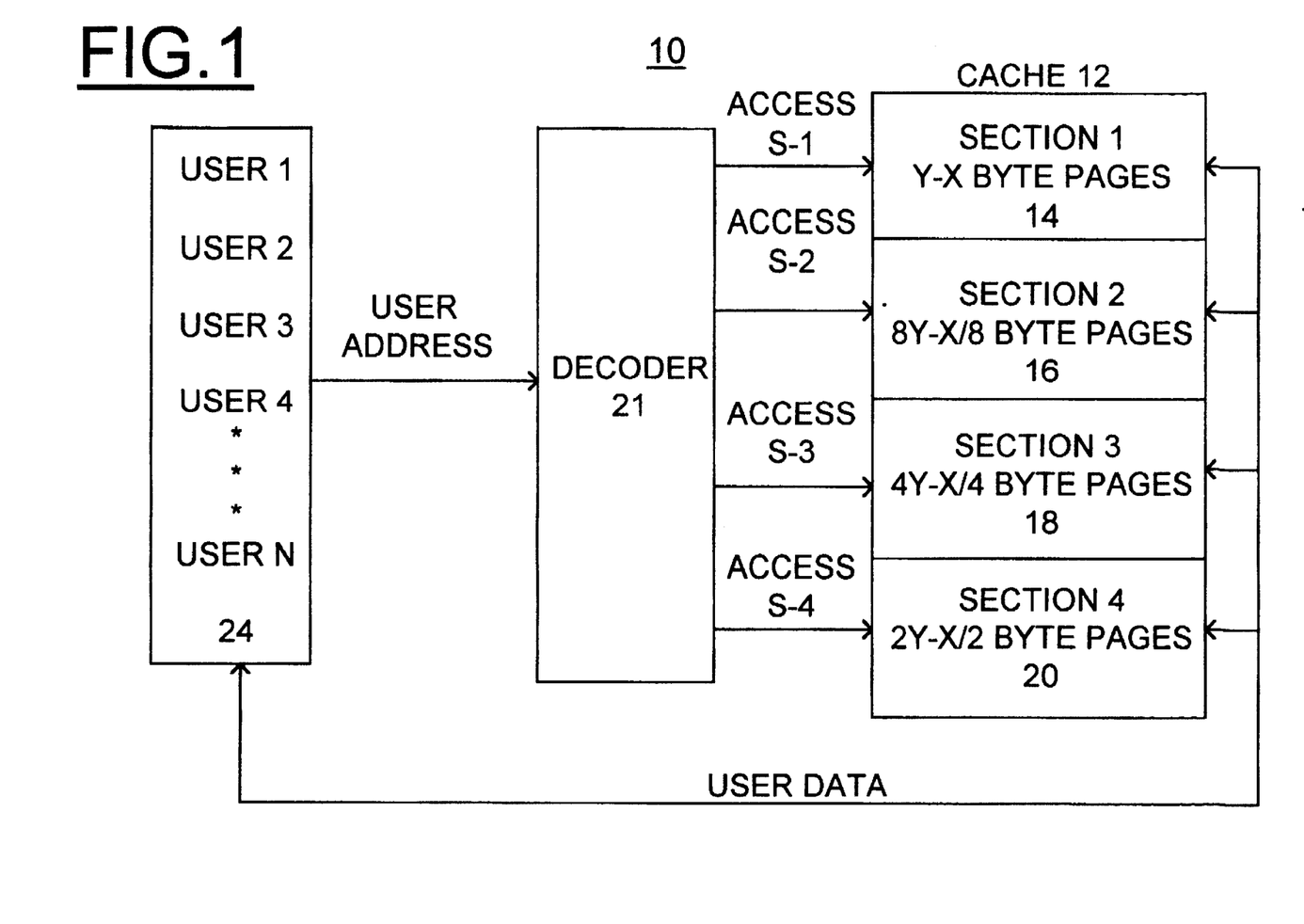
FIG. 1 is a block diagram representation of a configurable cache in accordance with the present invention.

Having reference now to the drawings, in FIG. 1, there is shown a block diagram representation of a configurable cache in accordance with the present invention generally designated by the reference character 10. The configurable cache 10 includes a cache 12 including a plurality of sections (1–4) 14, 16, 18, and 20, a decoder 21, and a plurality of users or devices (1–N) 24. The terms user and device are used interchangeably in this description. As shown, cache 12 includes four sections; however, it should be understood that a smaller or much larger number of cache sections could be provided. Those skilled in the art will recognize that a single section is also a useful configuration for cache 12.

Each of the sections 14, 16, 18, and 20 includes a selected, variable line size. For example, half the cache can be configured for smaller lines and the other half for larger lines. With this configuration, the access to one of the halves of the cache can be selected with the most significant device address bit.

For the example shown in FIG. 1, the first section 14 of cache 12 includes y lines, each line x bytes in size. The second section 16 of cache 12 includes 8 times y lines, each line x/8 bytes in size. The third section 18 of cache 12 includes 4 times y lines, each line x/4 bytes in size. The fourth section 20 of cache 12 includes 2 times y lines, each line x/2 bytes in size.

The variable line size cache memory 12 is shared between several devices 24 using the memory addresses to access selected cache characteristics via the decoder 21. As shown all users (1–N) 24 can access all sections 14, 16, 18 and 20 of the variable line size cache 12. The decoder 21 accepts user addresses and decodes the user addresses to access the sections of the cache 12. All users have access to all the different cache characteristics and sections that have been configured. Care is taken in assigning user addresses relative to the type of cache characteristics desired. With cache 12 including four sections, decoder 21 can for example, examine the two most significant bits of the device address to select a section of cache 12 for the access.

Those skilled in the art will recognize that the cache 10 is part of a larger memory or bus interconnection system. However, it should be understood that the other parts of the larger memory or bus interconnection system are not important for the understanding of the invention.

Figure 2:
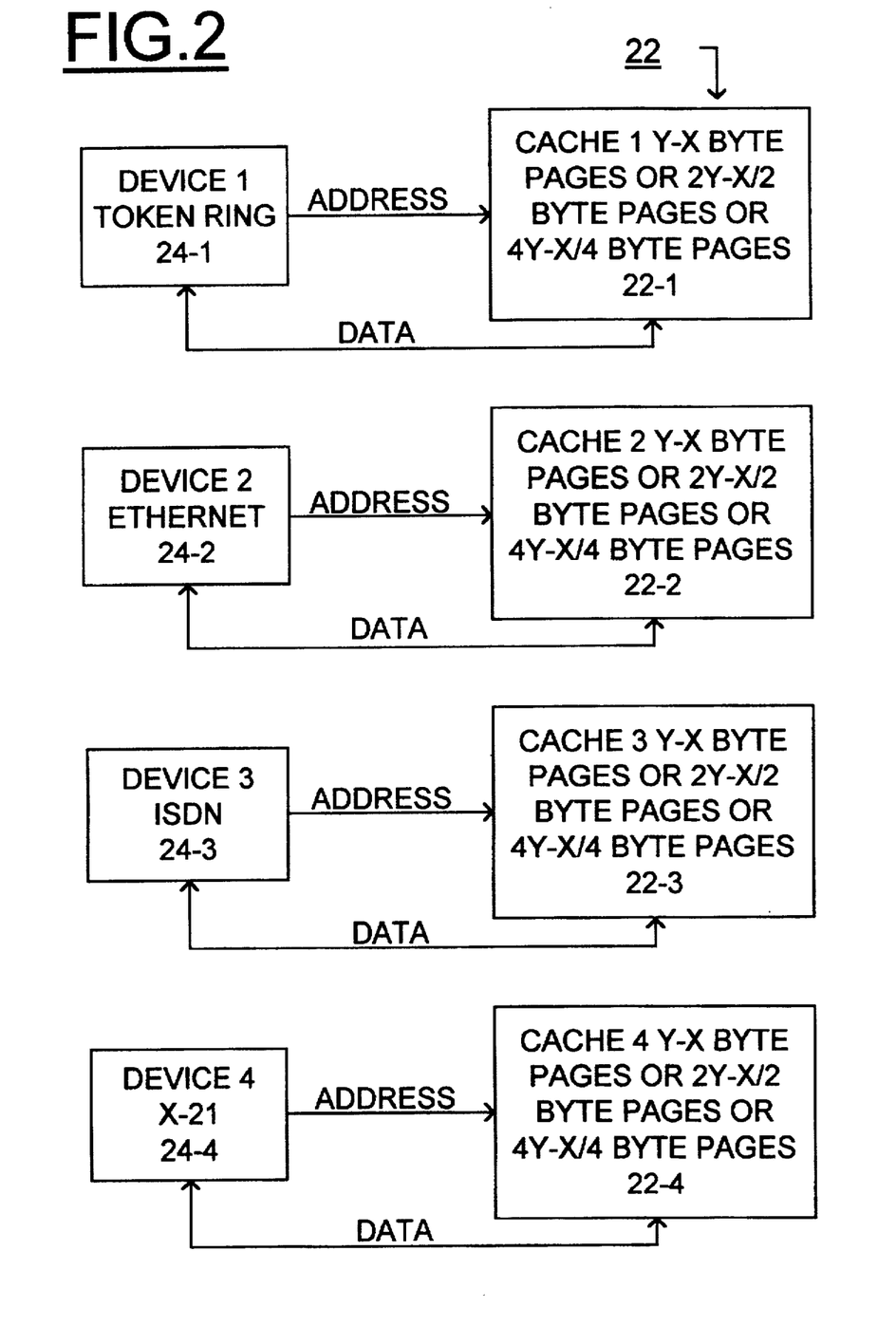
FIG. 2 is a block diagram representation of an alternative configurable cache in accordance with the present invention.

FIG. 2 illustrates an alternative configurable cache generally designated 22 including a corresponding dedicated cache section 22-1, 22-2, 22-3 and 22-4 for each of a plurality of devices 24-1, 24-2, 24-3 and 24-4 in accordance with the present invention. Each of the cache sections 22-1, 22-2, 22-3 and 22-4 includes storage for a predetermined number of bytes (x).

Each cache section 22-1, 22-2, 22-3 and 22-4 of x bytes is selectively configured into variable size lines. For example, the x bytes can be divided by 2, allowing for a cache line of x/2 bytes for receive operations or direct memory access (DMA) reads and a cache line of x/2 bytes for transmit operations or DMA writes. This configuration can be provided as a default configuration and devices 24 with DMA in a contiguous fashion would realize their best performance running the cache in this mode. The cache 22, when configured like this, only has to keep track of two addresses, the current transmit operation address and the current receive operation address.

Each cache section 22-1, 22-2, 22-3 and 22-4 contains a register 30 in FIGS. 3, 4, 5, and 6, that is appropriately set to select a cache configuration. Register bits are provided that allow each cache section 22-1, 22-2, 22-3 and 22-4 to be configured with variable size lines, different than the default configuration so that non-contiguous devices 24 can optimize their DMA throughput. For example, besides the default configuration each cache can also be configured via the register bits to contain four x/4 bytes lines, 2 lines for receive, and 2 lines for transmit operations, or eight x/8 byte lines, 4 lines for receive, and for example, 4 lines for transmit operations.

The overall cache size x does not change for the different selected configurations, so there is no extra hardware required to cache the data. The number and size of cache lines changes between the different configurations so that the hardware that keeps track of the least recently used (LRU) lines and the line hit logic can be somewhat more complex than conventional arrangements; however, the performance gains of non-contiguous device accesses makes the required hardware additions a desirable trade-off. Since each cache section 22-1, 22-2, 22-3 and 22-4 is programmed separately from each other, an I/O bridge chip can have a mix of contiguous and non-contiguous devices attached to it, all benefiting from their particular cache configuration.

Cache characteristic information including the number of cache lines and line size to be used can be provided in a page table entry for addressing the caches 12, 22-1, 22-2, 22-3 and 22-4. Also a one-level indirection can be used from the page table to a set of cache characteristics, reducing the amount of storage needed for the characteristics. For example, four types of caching can be specified on an I/O bridge chip, and then 2 bits in the page table entry can be used to determine the cache characteristics of the cache lines corresponding to memory in that page.

Each section 14, 16, 18 and 20 of the cache 12 of FIG. 1 can be configured like the separate cache sections 22 in FIG. 2.

Referring now to FIGS. 3, 4, 5 and 6, there are shown block diagram representations illustrating the cache configuration register 30 and an address recognition and storage mechanism or cache directory 32 for addressing the configurable caches 12 and 22 of FIGS. 1 and 2. In FIGS. 3, 4, 5 and 6, a cache line multiplier, y, equals one. Each data portion or line of the cache 12 and 22 has a set of address bits associated with it. When the cache is referenced, these address tags are checked. If the address bits of the user address match the address tag bits of the cache line, then that section of memory is in the cache. Note that when different size cache lines are used, different numbers of address bits are needed to uniquely identify the data stored in the cache line.

Figure 3:
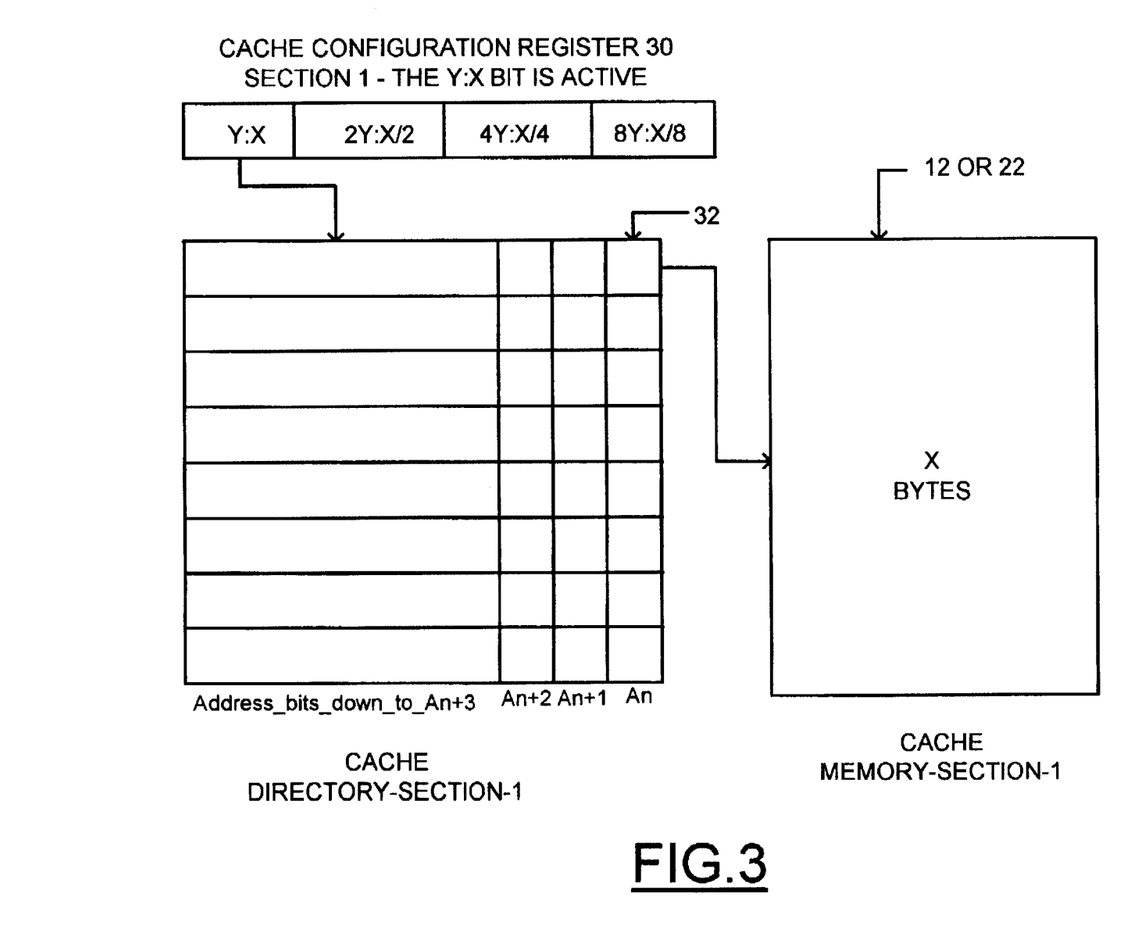
FIGS. 3, 4, 5 and 6 are block diagram representations illustrating a cache configuration register and an address recognition and storage mechanism of the configurable caches of FIGS. 1 and 2.

In FIGS. 3, 4, 5 and 6, the shaded area or shaded areas are the only valid parts of the cache directory. In FIG. 3, the y:x bit is active in the cache configuration register 30 and the last 3 address bits in the cache directory 32 are not used in this configuration. Because there is only one cache line, there is only one set of address tags active. This first section of the cache 12 or 22 has a line size of x bytes.

Figure 4:
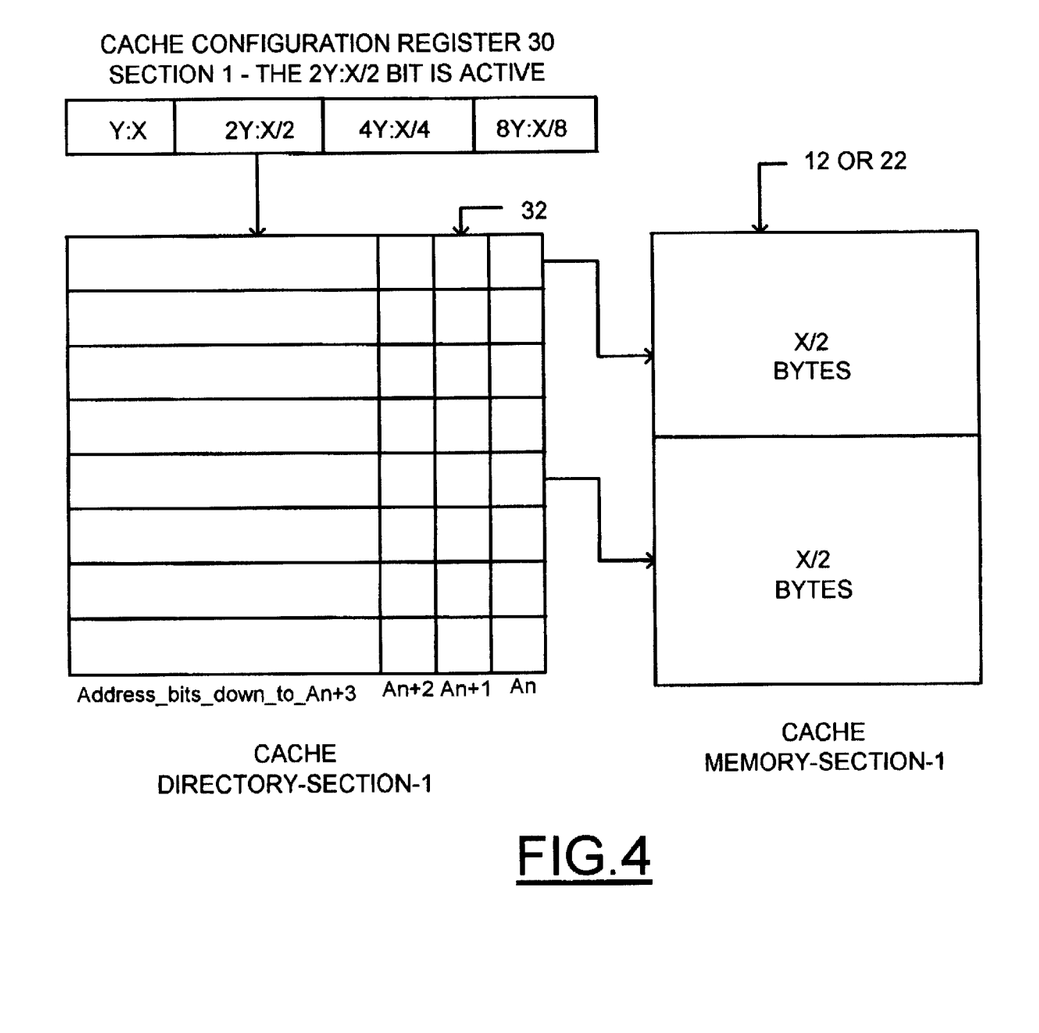

In FIG. 4, the 2y:x/2 bit is active in the cache configuration register 30 and the last 2 address bits in the cache directory 32 are not used in this configuration. Because there are two cache lines, there are two sets of address tags active. This first section of the cache 12 or 22 has a line size of x/2 bytes.

Figure 5:
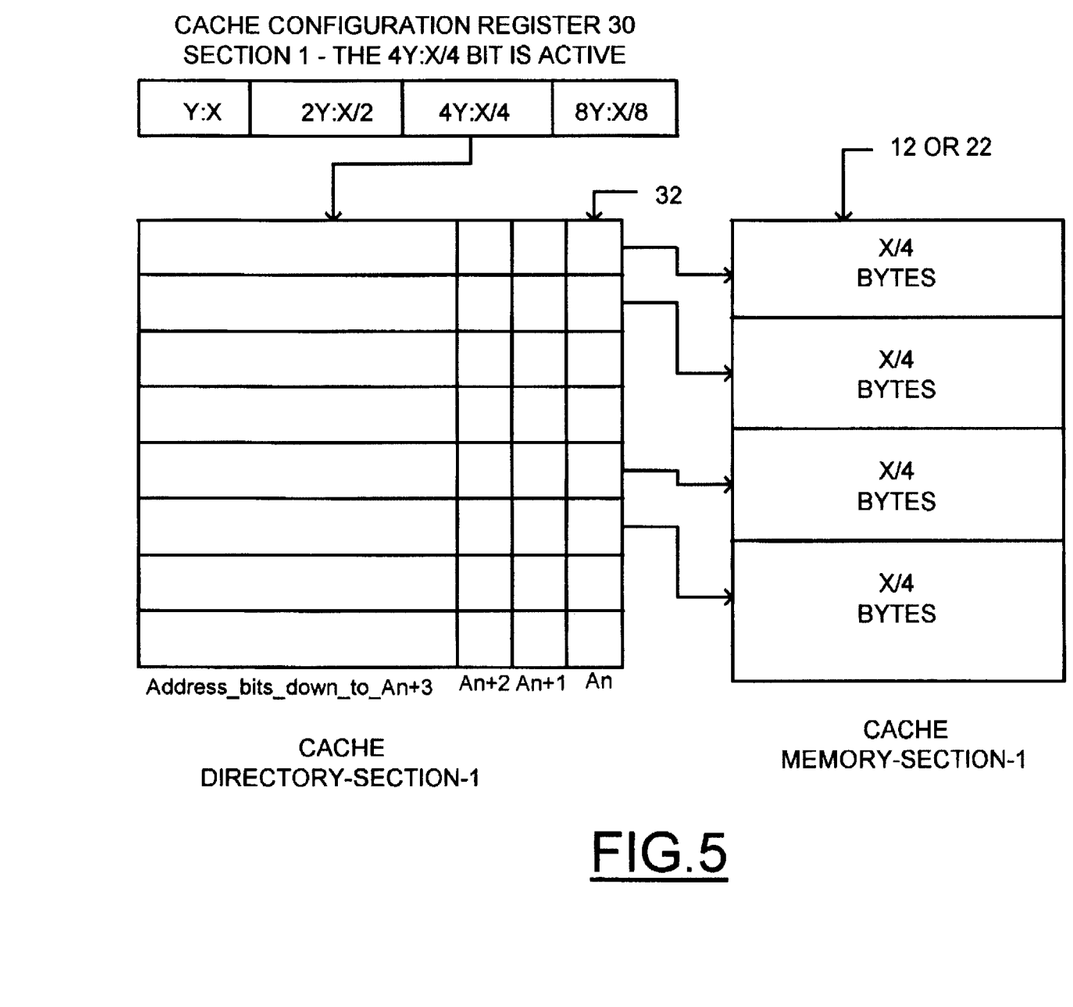

In FIG. 5, the 4y:x/4 bit is active in the cache configuration register 30 and the last address bit in the cache directory 32 is not used in this configuration. Because there are four cache lines, there are four sets of address tags active. This first section of the cache 12 or 22 has a line size of x/4 bytes.

Figure 6:
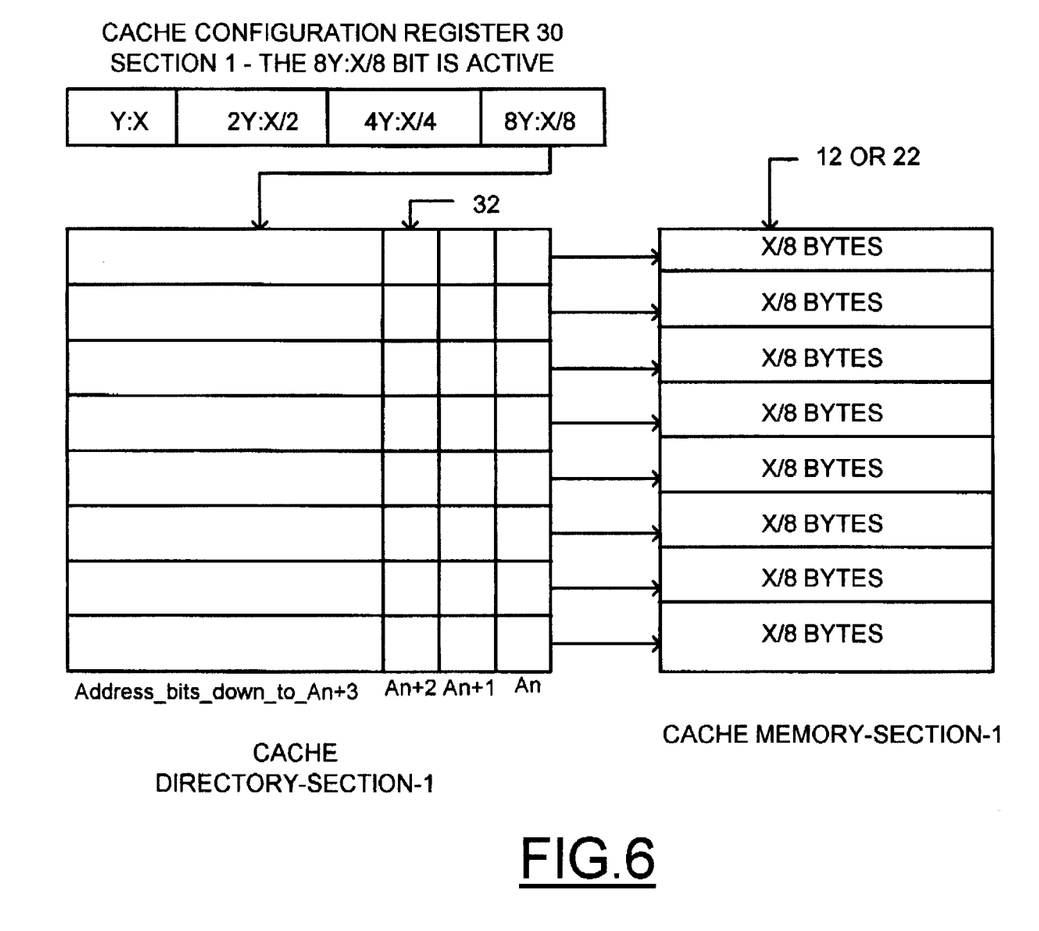

In FIG. 6, the 8y:x/8 bit is active in the cache configuration register 30 and all of the address bits in the cache directory 32 are used in this configuration. Because there are eight cache lines, all sets of address tags are active. This first section of the cache 12 or 22 has as an example, a line size of x/8 bytes.

Figure 7:
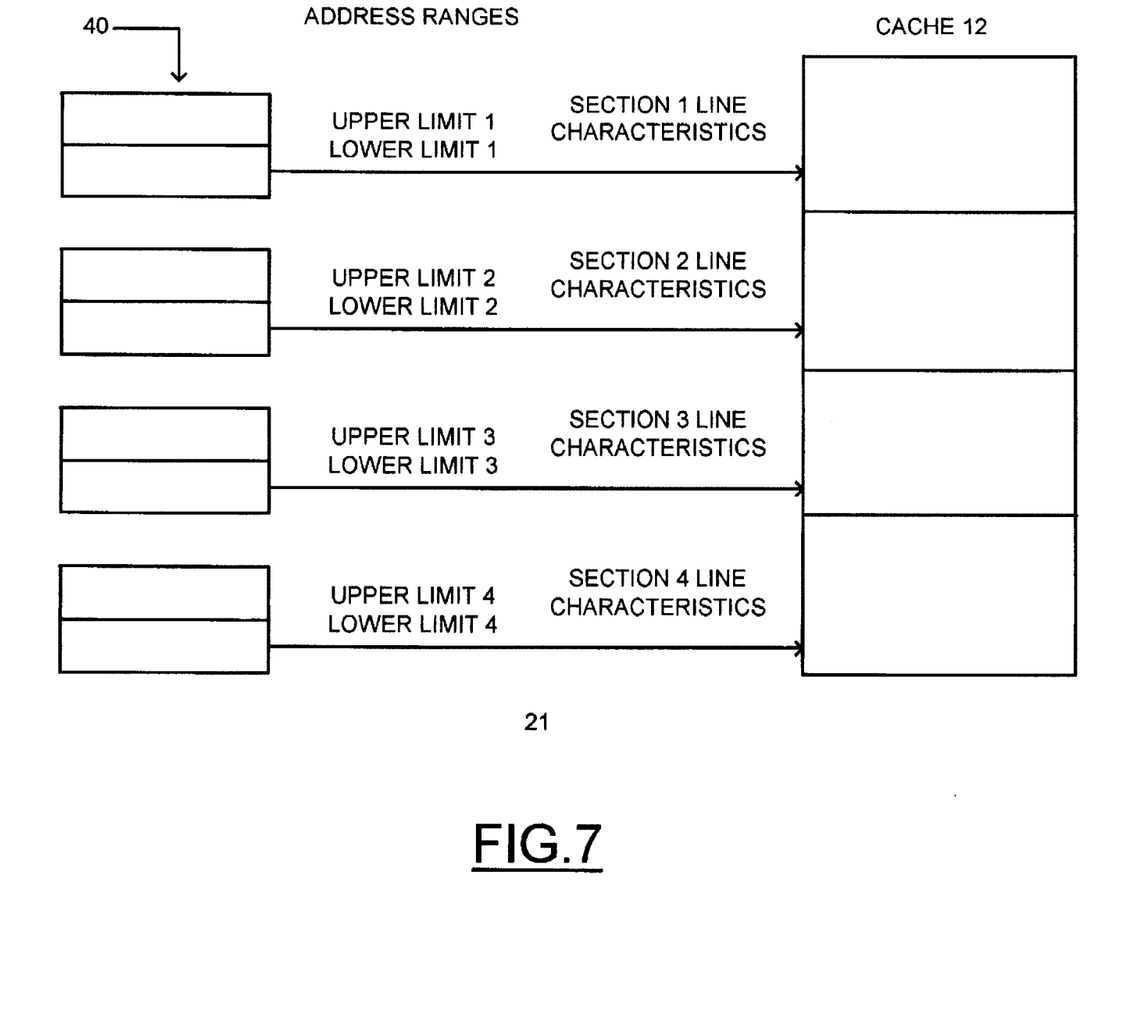
FIG. 7 is a block diagram representation illustrating a decoder of the configurable cache of FIG. 1.

FIG. 7 illustrates an example of a decoder 21 of the configurable cache 12 of FIG. 1. As shown, decoder 21 includes a predefined address range comparison function 40 for line characteristics of each section (1-4) 14, 16, 18 and 20 of the cache 12. Comparison function 40 includes an upper limit and a lower limit of each section (1-4) 14, 16, 18 and 20 of the cache 12, used for comparing with an address and selecting a corresponding section 14, 16, 18 and 20. When an address falls within the range between the upper and lower limit for a particular section 14, 16, 18 or 22, then that particular section is accessed.

Figure 8:
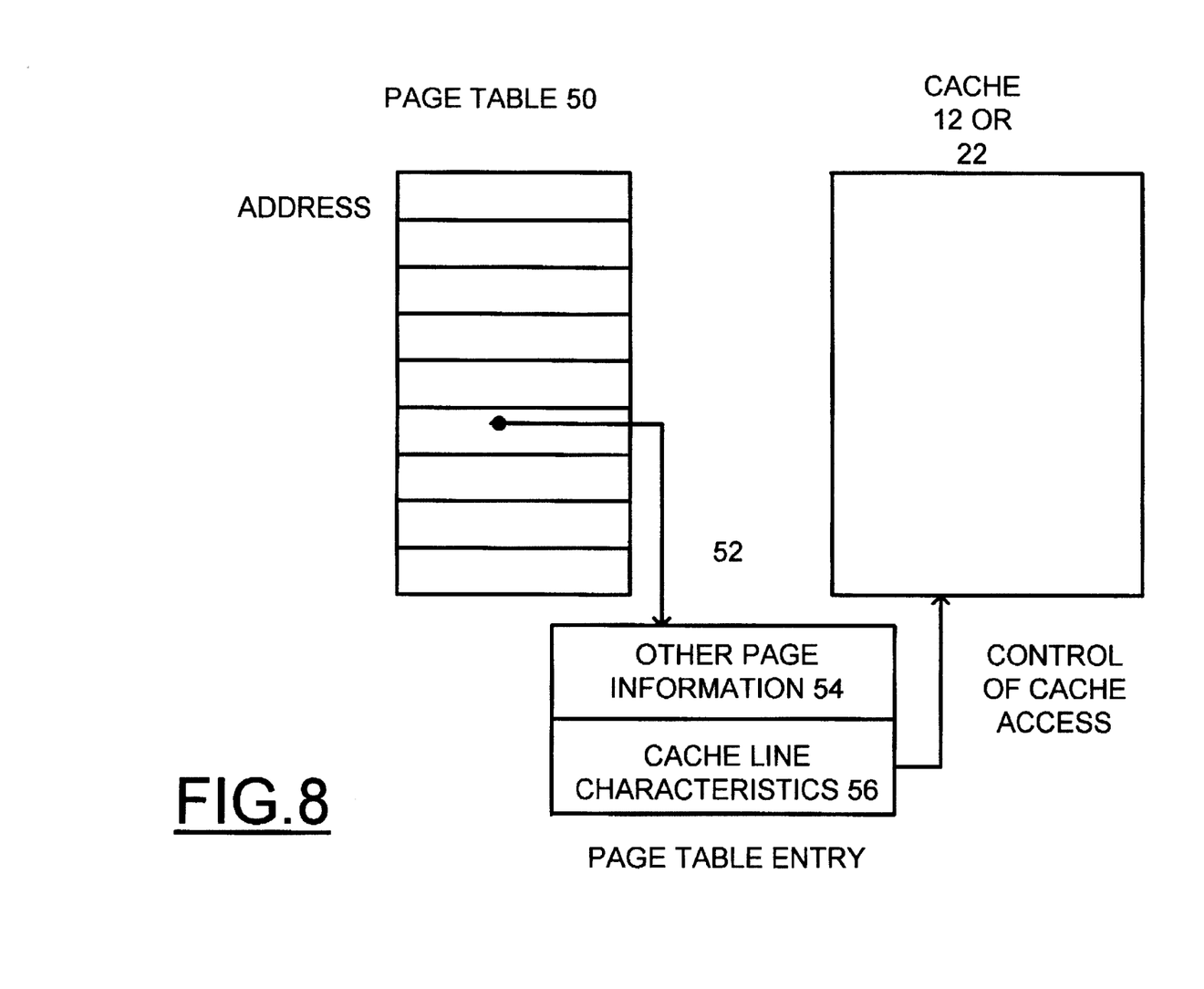
FIG. 8 is a block diagram representation illustrating a page table arrangement for storing cache characteristics information for controlling cache access to the configurable caches of FIGS. 1 and 2.

FIG. 8 is a block diagram representation illustrating a page table arrangement for storing cache characteristic information for controlling cache access to the configurable caches 12 and 22. A page table 50 stores address information. Each page table entry 52 within the page table 50 includes other page table information 54 and a cache line characteristic data 56. The cache line characteristic data 56 includes the number of address bits to be matched in the cache directory 32 and a cache line size. The cache line characteristics data 56 can also be described as a section selection function for selecting one of the sections 14, 16, 18 and 20 of cache 12.

While the present invention has been described with reference to the details of the embodiments of the invention shown in the drawing, these details are not intended to limit the scope of the invention as claimed in the appended claims.

What is claimed is:

1. A configurable variable cache, comprising:

cache memory means for storing data, said cache memory means including at least one section and each said at least one section including configuration register means for dynamically and selectively configuring said at least one section into a variable number of lines and for dynamically configuring said variable number of lines with a selectively variable size;

at least one device connected to said cache memory means; and addressing means coupled to said cache memory configuration register means for accessing said selectively variable sized lines by said at least one device.

2. A configurable variable cache as recited in claim 1 wherein said cache memory means is selectively configured into multiple sections and each section includes a variable number of lines, and each line having a selectively variable size and wherein each said cache memory configuration register means are programmed separately of each other.

3. A configurable variable cache as recited in claim 2 wherein a plurality of devices are connected to said cache memory means and each of said devices having access to said multiple sections utilizing said addressing means.

4. A configurable variable cache as recited in claim 1 wherein said cache memory means at least one section includes an overall storage size for a predetermined number (x) of bytes.

5. A configurable variable cache as recited in claim 4 wherein said cache memory means at least one section is selectively configured into lines of x/2 bytes.

6. A configurable variable cache as recited in claim 4 wherein said cache memory means at least one section is selectively configured into lines of x/4 bytes.

7. A configurable variable cache as recited in claim 4 wherein said cache memory means at least one section is selectively configured into lines of x/8 bytes.

8. A configurable variable cache as recited in claim 2 wherein set ones of said multiple sections of said cache memory means are selectively configured into lines of x/2 bytes, x/4 bytes and x/8 bytes.

9. A configurable variable cache as recited in claim 2 wherein said predefined ones of said plurality of said lines are selectively dedicated to predefined device operations and wherein said addressing means includes predefined address bits for dynamically selecting predefined ones of said multiple sections and includes selected address bits used for said selectively dedicated lines to predefined device operations.

10. A configurable variable cache as recited in claim 2 wherein a plurality of devices are connected to said cache memory means and wherein predefined ones of said plurality of said lines of said multiple sections are selectively dedicated to one of said plurality of devices.

11. A configurable variable cache as recited in claim 2 wherein a plurality of devices are connected to said cache memory means and includes address ranges means for selecting predefined ones of said multiple sections for said plurality of devices.

12. A configurable variable cache as recited in claim 1 wherein said addressing means includes a page table including a plurality of page table entries and said page table entries are used for controlling cache access; and said page table entries including a number of address bits to be matched in a cache directory and a cache line size.

* * * * *